US007197979B2

(12) United States Patent
Derscheid

(10) Patent No.: US 7,197,979 B2
(45) Date of Patent: Apr. 3, 2007

(54) CONTROLLED BALE EJECTION MECHANISM

(75) Inventor: Daniel Eric Derscheid, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/150,672

(22) Filed: Jun. 10, 2005

(65) Prior Publication Data
US 2006/0278103 A1 Dec. 14, 2006

(51) Int. Cl.
*B30B 5/04* (2006.01)
*A01D 90/10* (2006.01)

(52) U.S. Cl. .................. 100/87; 100/88; 100/89; 100/5; 56/341; 56/344; 414/24.6

(58) Field of Classification Search .......... 100/5, 100/7, 87, 88, 89, 100; 56/341, 344, 345, 56/346, 350; 414/245, 246, 24.5, 24.6
See application file for complete search history.

(56) References Cited

U.S. PATENT DOCUMENTS

| 4,483,247 | A | 11/1984 | Coeffic ..................... 100/88 |
| 4,770,093 | A | 9/1988 | Gunther et al. ............ 100/88 |
| 4,779,527 | A | 10/1988 | Ardueser et al. .......... 100/88 |
| 4,821,637 | A | 4/1989 | Viaud ........................ 100/88 |
| 5,822,967 | A * | 10/1998 | Hood et al. ................ 56/341 |
| 6,928,796 | B2 * | 8/2005 | Viaud ........................ 53/587 |
| 2004/0103632 | A1 * | 6/2004 | Derscheid et al. .......... 56/341 |

* cited by examiner

*Primary Examiner*—Lowell A. Larson
*Assistant Examiner*—Jimmy Nguyen

(57) ABSTRACT

A controlled bale ejection mechanism for an agricultural baler is provided. The mechanism includes a bale support which is positioned below the bale when it is ejected, that catches and supports the bale. The bale support is then translated rearward by a hydraulic cylinder and guided by support rails. As the bale support and bale approach the desired location, the bale support is lowered by tilting the rail assembly downward. An articulating shoe is used to support and lower the rails. The bale support tilts as it is lowered, thereby creating a dumping action. If additional tilting is required due to geometry limitations, additional bale support tilt can be created by a weight shift of the bale support, changing the trajectory of the rail or torque induced by the bale support cylinder. The bale is set down on the ground and the ramp assembly resets to prevent the bale from rolling forward and preparing for the next cycle. Springs are used to retract the articulating shoe and lift the rails into transport position. The timing of this system is integrated into the hydraulic baler functions (primarily the discharge gate) so no additional action is required from the operator when ejecting the bale.

36 Claims, 7 Drawing Sheets

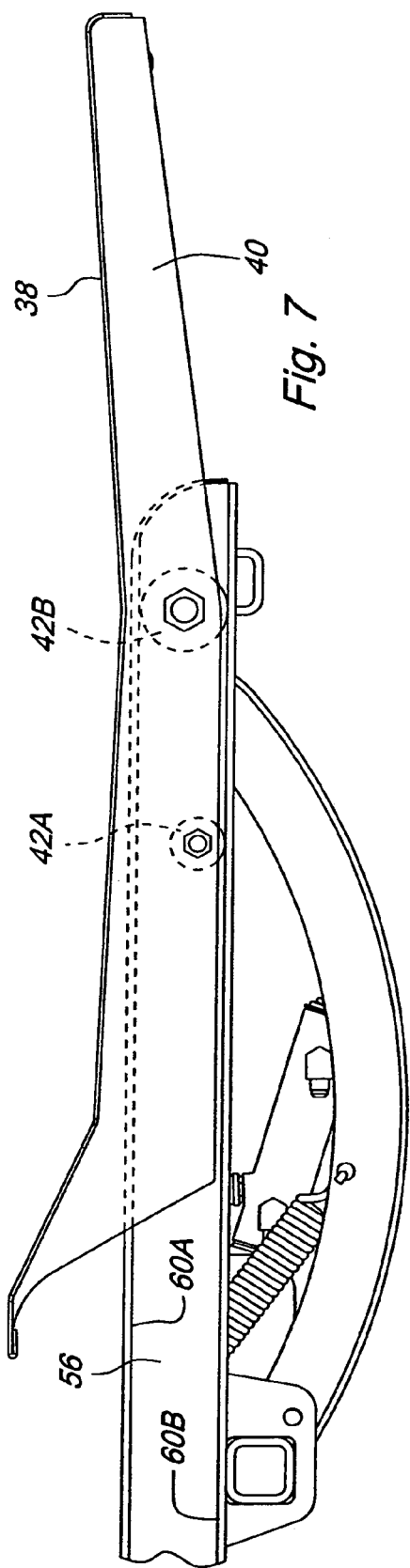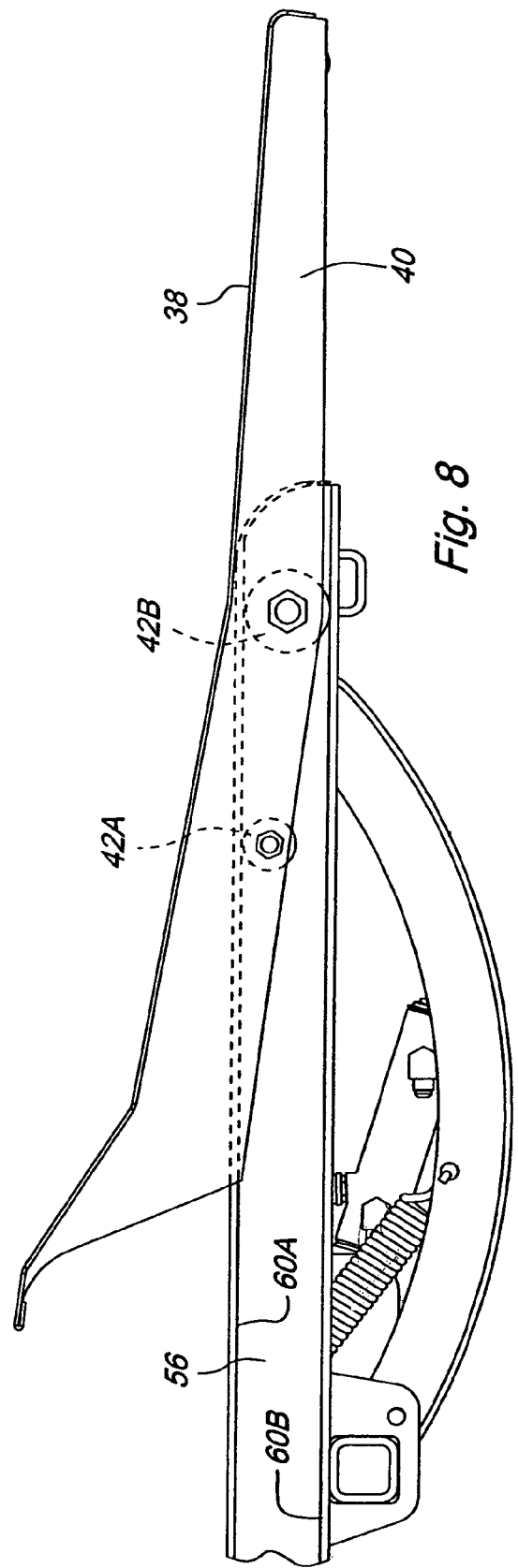

CONTROLLED BALE EJECTION MECHANISM

FIELD OF THE INVENTION

The present invention relates generally to balers for forming cylindrical bales (commonly referred to as "round" bales). More particularly, the present invention relates to a cylindrical baler with an ejection mechanism for moving a bale during discharge sufficiently rearward of the baler so that the discharge gate of the baler may be closed without hitting the discharged bale. Specifically, the present invention relates to such an ejection mechanism which places the bale gently on the ground without imparting a rolling motion to the bale thereby preventing roll-away, twine unwrapping and damage to wrapping material.

BACKGROUND OF THE INVENTION

Previously known cylindrical balers generally include a rear bale discharge gate pivotally mounted to a front portion of the baler frame. A bale is discharged from such a machine by pivoting the discharge gate rearwardly and upwardly permitting the bale to drop directly onto the ground or by first pivoting the discharge gate upwardly and rearwardly and then activating a lower conveyor on which the bale rests during formation in the bale forming chamber of the baler. The lower conveyor urges the bale rearwardly out of the machine and onto the ground. With both designs, the bale generally comes to rest underneath the discharge gate. According to one commonly used method for operating such cylindrical balers, after the bale has been discharged, the operator pulls forward a short distance so that the discharge gate may be closed without hitting the discharged bale. In order to be able to pull forward without disturbing the windrow in front of the baler and possibly over feeding the baler when the baling operation is resumed, the operator must backup a few meters before discharging a bale. This is a tedious and time consuming procedure. If it is not executed properly, there is a possibility that the gate, when closed, may rest on top of the bale. This may damage the baler or even cause it to turn over.

Several solutions have been proposed to simplify the procedure for discharge of cylindrical bales. For example, in U.S. Pat. No. 4,206,587, a cylindrical baler with a resiliently mounted transverse bar for rearwardly propelling a bale as it is discharged from the chamber of the baler is disclosed. With the action of the resiliently mounted bar, the bale is propelled with sufficient force to roll the bale rearwardly of the baler a sufficient distance so that the discharge gate of the baler may be closed without moving the baler forwardly. Also, in U.S. Pat. Nos. 4,208,862 and 4,218,866 a cylindrical baler with a bale forming chamber defined by plurality of reversably driven chains is disclosed. The chains are driven in a first direction during the bale forming operation and then are automatically reversably driven during the bale discharge operation to impart a rearwardly directed top spin to the bale as it is discharged from the bale forming chamber. The top spin carries the bale away from the baler a sufficient distance so that the baler does not have to be driven forwardly to permit the closing of the discharge gate. Both of these approaches present certain inherent disadvantages. Both approaches provide a rearwardly directed top spin to the bale as it is discharged from the bale forming chamber. The rearward motion of the bale is uncontrolled. If the baling operation is taking place in a hilly area, the bale may roll down a hill and could position the bale in a location where it would be difficult to retrieve. Furthermore, because, with varying crop conditions, the weight of the bale may vary from one bale to the next during the baling operation, the amount of energy imparted to the bale may need to be varied from one bale to the next. With the foregoing designs, such variation is not possible.

In U.S. Pat. No. 4,393,764 a cylindrical baler with a mechanism for moving a bale rearwardly of the discharge gate following discharge of the bale from the bale forming chamber is disclosed. The discharge gate includes at least a portion of the belts or chains which define the bale forming chamber and a pump for driving the belts or chains in a direction opposite to that used for bale formation. The gate is further operable to bring a portion of the belts or chains into contact with a discharged bale and to displace the bale rearwardly from the baler along the ground by imparting a controlled rearward rolling action to the bale. Such a baler provides a solution to many of the problems associated with the prior art balers discussed above. However, such a baler still suffers from certain limitations. For example, the belts defining the bale forming chamber must be tensioned in order to apply rolling action to the bale following discharge. Second, a mechanism for driving the belts in reverse must be provided. Third, the height of the gate must be properly adjusted so that the belts contact the bale. All of these requirements add complexity to the baler. In addition, if the baler is ejecting a bale on a hill with the baler headed downhill, the bale may not be moved entirely free of the gate due to the tendency of the bale to roll toward the baler.

Many round baler ejection devices include push bar devices to displace the bale clear from the path of the gate. A push bar device is disclosed in U.S. Pat. No. 4,483,247 wherein a cylindrical baler has a bale discharge ejector movable between a retracted position and an extended position. In the retracted position, the ejector is engageable with a bale discharged on the ground underneath a bale discharge gate of the baler and is operable to move the bale rearwardly of the gate as the ejector is moved to its extended position. The ejector is retained in the extended position while the gate is closed to insure that the bale remains clear of the gate during closing. U.S. Pat. No. 4,779,527 also discloses a push bar device wherein a U-shaped bale push bar straddles a discharge gate of a large round baler with opposite legs of the bar being respectively pivotally connected to a pair of support brackets secured to and projecting rearwardly alongside the discharge gate from upper rear locations of opposite sidewall sections forming a portion of the baler main frame. A pair of chains are coupled between forward locations of the gate and the legs of the push bar and serve as lost-motion connections that cause the push bar to extend and retract respectively in following relationships to opening and closing movements of the gate such that interference between the gate and a discharged bale is avoided. An over center spring assembly acts between the push bar and support brackets to bias the bar toward its retracted position when the gate is closed and to bias the push bar toward its extended position when the gate moves a small amount towards its open position a small amount beyond an intermediate position permitting discharge of a bale. Such devices still tend to cause excessive rolling of the bale; contributing to instability on hills, unrolling of twine and/or damage to wrapping materials.

Accordingly, there is a clear need in the art for a mechanism for producing a controlled discharge of a bale from a cylindrical baler that does not impart a rolling motion to the bale as it is discharged, thereby eliminating the problem of twine unwinding or damage to wrapping material.

SUMMARY OF THE INVENTION

In view of the foregoing it is an object of the invention to provide a cylindrical baler with an ejection mechanism which will move a discharged bale, in a controlled manner, sufficiently rearwardly behind the gate of the baler so that the gate may be closed without having to move the baler forwardly after ejecting the bale to close the gate.

Another object of the invention is to provide such an ejection mechanism which insures that the discharged bale will remain in a rearward location while the gate is being closed.

A further object of the invention is to provide such an ejection mechanism that places the bale gently on the ground and does not impart a rolling motion to the bale as it is discharged.

An additional object of the invention is the provision of such an ejection mechanism that eliminates twine unwinding and damage to bale wrapping material due to rolling of the bale after discharge.

This invention is a bale ejection mechanism that places the bale on the ground gently. The principle of operation is based on a mechanism that controls the lateral and rotational momentum of the bale while vertically displacing the bale downward leaving minimal vertical drop to the ground at the release point.

The system consists of a receiver (such as a cart, gripper, crossmembers, or like devices) which captures the bale and does not allow it to roll or move freely. If desired, the receiver may be displaced laterally away from the bale chamber to place the bale in a favorable location. This can be guided by a sliding translation, roller/rail assembly, pivoting linkage or like devices; and may be powered by gravity, cylinder, actuator, motor or external forces. The bale is set down by controlled devices (gravity, spring, cylinder, actuator, motor, external forces or like devices) near the ground and released by tilting or releasing the components of the receiver.

The bale is normally released perpendicular to the axis of the bale, but may be angled to further prevent bale rolling.

The receiver or supporting assembly may have a weighing device which measures bale weight during the ejection process.

This invention prevents substantial bale rolling by controlling the momentum of the bale and releasing the bale close to the ground. This results in a higher quality bale package due to preservation of the wrapping material. If used with lateral translation of the bale clear from the path of the gate, it allows the operator to eject bales on all terrain (including hillsides) without backing up (a common practice on flat terrain with ramps and pushbars).

In general, a controlled bale ejection mechanism for an agricultural baler is provided. The mechanism includes a bale support which is positioned below the bale when it is ejected, that catches and supports the bale. The bale support is then translated rearward by a hydraulic cylinder and guided by support rails. As the bale support and bale approach the desired location, the bale support is lowered by tilting the rail assembly downward. An articulating shoe is used to support and lower the rails. The bale support tilts as it is lowered, thereby creating a dumping action. If additional tilting is required due to geometry limitations, additional bale support tilt can be created by a weight shift of the bale support, changing the trajectory of the rail or torque induced by the bale support cylinder. The bale is set down on the ground and the ramp assembly resets to prevent the bale from rolling forward and preparing for the next cycle.

Springs are used to retract the articulating shoe and lift the rails into transport position. The timing of this system is integrated into the hydraulic baler functions (primarily the discharge gate) so no additional action is required from the operator when ejecting the bale.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

FIG. 7 is an elevational view of a portion of the bale ejection mechanism illustrating the tilting action of the bale cradle relative to the rail assembly; and, FIG. 8 is an elevational view of a portion of the bale ejection mechanism similar to FIG. 7 illustrating the tilting action of the bale cradle relative to the rail assembly.

DESCRIPTION OF THE PREFERRED EMBODIMENT

Figure 1:
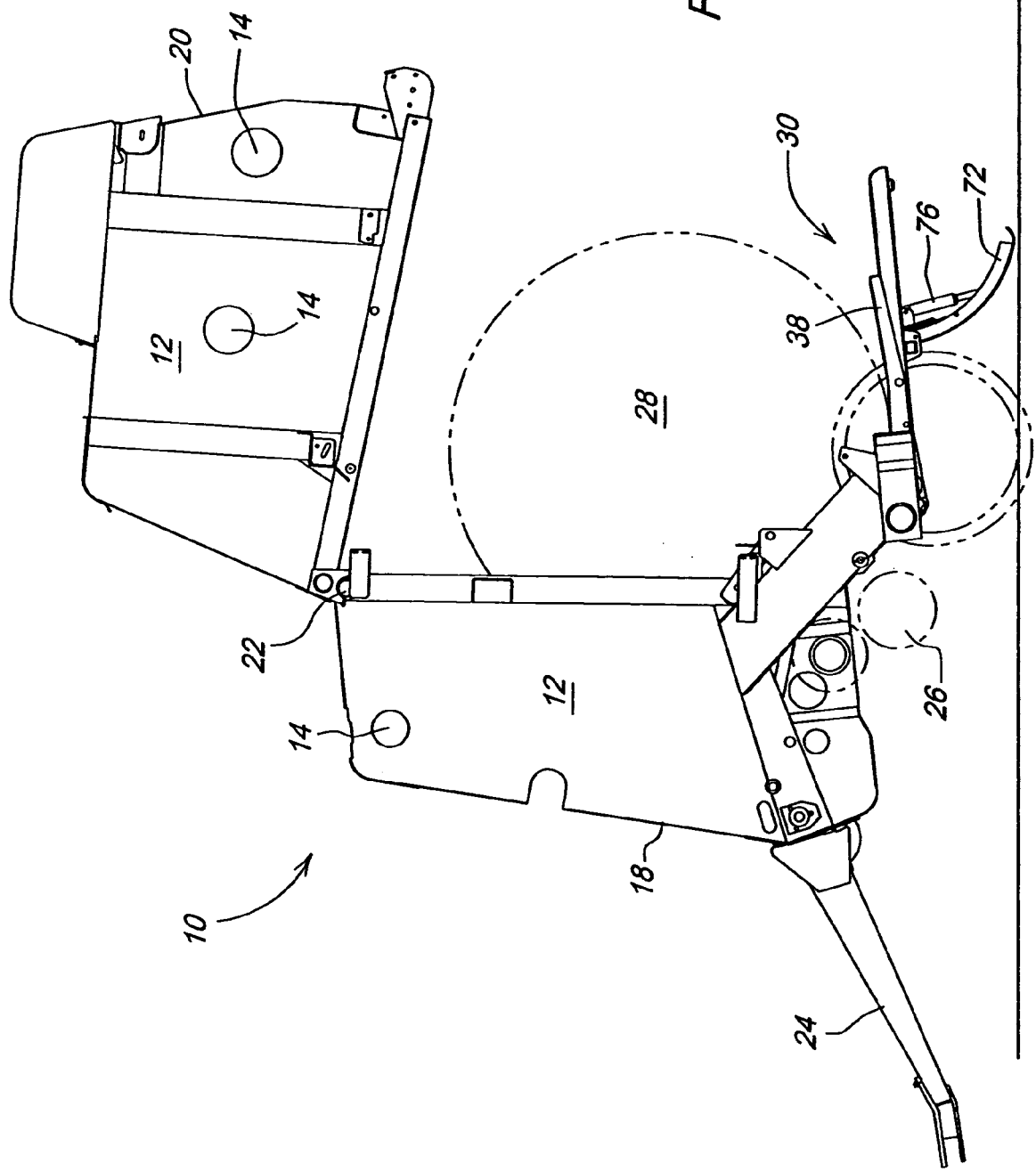
FIG. 1 is a side elevational view of a baler incorporating an ejection mechanism in accordance with the preferred embodiment of the invention.

With reference now to the drawings and particularly FIG. 1, it can be seen that an exemplary agricultural baler for forming cylindrical bales of crop material is designated generally by the numeral 10. Baler 10 is generally comprised of a pair of opposed sidewalls 12, a plurality of longitudinally extending side-by-side belts (not shown) supported on a plurality of rollers 14 (only a few of which are shown). A bale forming chamber is defined by the sidewalls 12, the rollers 14 and belts. The sidewalls 12 (and the components contained therebetween) may be partitioned along a parting line into a front frame section 18 and a bale discharge gate 20 pivotally mounted to front section 18 on a pivot 22. The bale discharge gate 20 is moveable back and forth between a closed position for bale formation and an open position for bale discharge by means of hydraulic cylinders (not shown).

In the general operation of the baler 10, the baler is drawn through a field by a prime mover (not shown) attached to a tongue 24. Crop material is fed into the bale forming chamber from a windrow of crop on the ground by a pickup 26. In the baler 10, the crop material is rolled in spiral fashion into a cylindrical bale 28. Upon completion, the bale 28 is wrapped with twine or other appropriate wrapping material and is discharged by actuation of gate cylinders that open gate 20 permitting the completed bale to be discharged from the baler onto the ground. The invention herein resides in an improved mechanism for discharge and ejection of cylindrical bales formed by a baler such as that illustrated.

Figure 5:
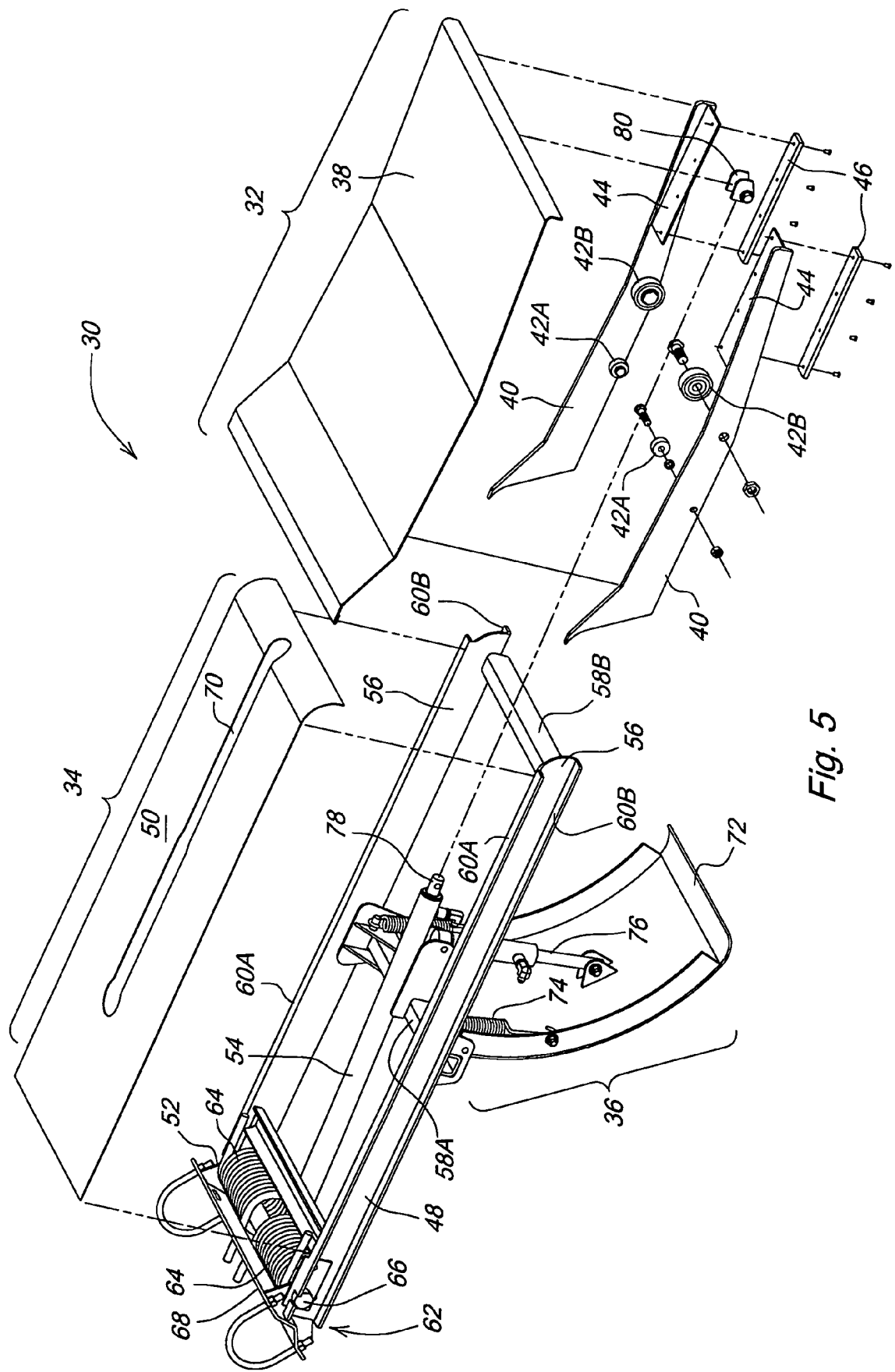
FIG. 5 is an exploded perspective view of a bale ejection mechanism according to the invention.
Figure 6:
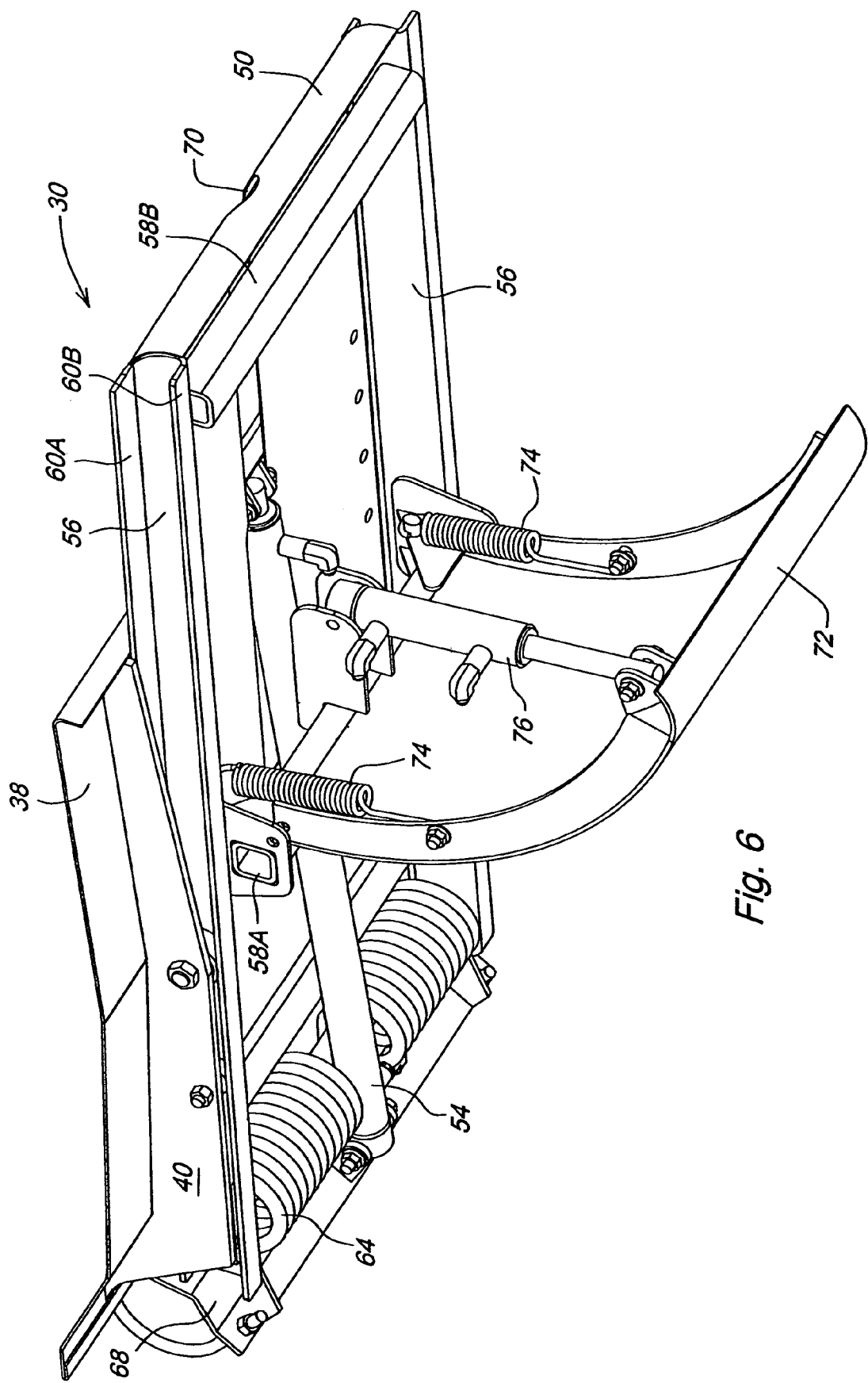
FIG. 6 is a perspective view of the assembled bale ejection mechanism according to the invention.

Referring now to FIGS. 5 and 6 a bale ejection mechanism 30 according to the invention is shown in further detail. As shown the ejection mechanism 30 is comprised generally of a bale support assembly 32, a tilting rail assembly 34 for supporting the bale support assembly 32, and a ground engaging support assembly 36 for supporting the rail assembly 34. The bale support assembly 32 is comprised of a bale cradle 38 and a pair of support members 40. In the preferred embodiment the bale cradle 38 is an angled plate member as illustrated for supporting a cylindrical bale as will be detailed below. The bale cradle 38 is mounted to the support members 40, as are a plurality of bearing elements 42. More particularly, first and second bearing elements 42A and 42B, respectively, are journaled to each support member 40. For reasons that will be described below bearing elements 42A are of a smaller diameter than bearing elements 42B. The support members 40 may also include flange portions 44 as shown, to which are affixed wear plates 46.

The rail assembly 34 is comprised generally of a rail frame 48, a top plate 50, a resilient support assembly 52 and a length extensible actuator such as hydraulic cylinder 54. The rail frame 48 includes a pair of rails 56 attached to transverse cross bars 58A and 58B. For reasons set forth below, each rail 56 includes first and second flanges 60A and 60B respectively which as will be described below act as bearing elements or guides for the bearing elements 42 of the bale support assembly. A resilient support assembly 52 is provided at a first end 62 of the rail assembly 34. In the embodiment illustrated the resilient support assembly 52 comprises one or more coil springs 64 journaled on a spring support bar 66 mounted between the rails 56. Those having skill in the art will recognize that the resilient support assembly 52 could take many forms other than coil springs. A mounting plate 68 is secured to the rail frame 48 proximal to the springs 64 and includes means for pivotally mounting the plate 68 and the structure to which it is attached, to a pivot bar (not shown) attached to the baler frame. A hydraulic cylinder 54 or other appropriate length extensible actuator is secured to the mounting plate 68 between the rails 56 and extends parallel thereto over the central cross bar 58A. For reasons which will become apparent as the description continues, the top plate 50 includes a slot 70 which corresponds to the location of the hydraulic cylinder 54 when the plate 50 is secured to the rails 56.

The ground engaging support assembly 36 is comprised primarily of a skid plate member 72 which, in the preferred embodiment, has an arcuate cross-section. Those having skill in the art will recognize that the ground engaging support assembly 36 could be something other than an arcuate skid plate member e.g. a length extensible actuator, a wheel assembly etc. The skid plate member 72 is pivotally mounted to the central cross bar 58A of the rail frame 48 using appropriate pivot pins or fasteners (not shown in detail). In the preferred embodiment illustrated the skid plate member 72 is further secured to the rail frame 48 by one or more springs 74 or other appropriate resilient members capable of urging the skid plate member 72 or other ground engaing device upwardly toward the rail frame 48. The springs 74 tend to pivot the skid plate member 72 toward the rail frame 48. For reasons which will be described below, a length extensible actuator such as hydraulic cylinder 76 is also secured to both the rail frame 48 and the skid plate member 72.

The bale support assembly 32 is slidably mounted to the rail assembly 34 such that the bearing elements 42 attached to the support members 40 are captured between the upper and lower flanges 60A and 60B respectively of each rail 56, and the wear plates 46 are in sliding contact with the lower flanges 60B of the rails 56. It should be understood that while the embodiment illustrated shows bearing elements 42 being captured between the flanges 60 of the rails 56, the concept of the invention can be carried out in a number of other ways. For example, the bearing elements 42 could be mounted to the rail frame 48 and the means for capturing the bearing elements 42 could be located on the support members 40 of the bale support assembly 32. It should also be understood that there are a number of other arrangements for allowing the desired sliding or rolling movement between the bale support assembly 32 and the rail assembly 34. For example the rails 56 need not be flanged track members as illustrated and could have a slot or single flange which appropriately engages the bearing elements. An end 78 of hydraulic cylinder 54 extends through the slot 70 of the top plate 50 and attaches to the underside of the cradle 38 by means of an attachment fixture 80. Thus as the length extensible actuator or hydraulic cylinder 54 is extended and retracted the bale support assembly 32 is movably translated back and forth relative to the rail assembly 34.

Figure 2:
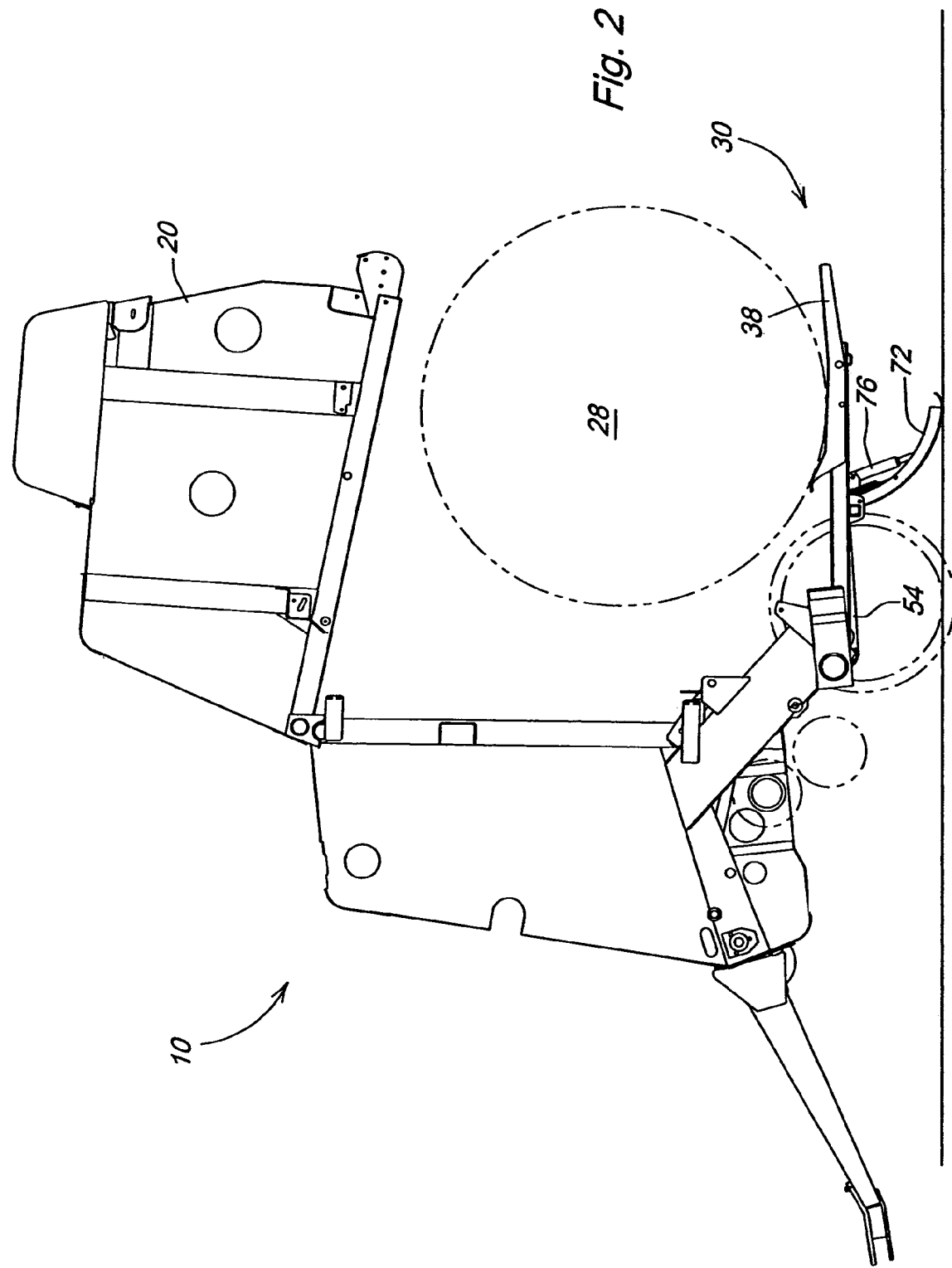
FIG. 2 is a side elevational view of the baler of FIG. 1 illustrating the discharge of a bale from the baler and the operation of the ejection mechanism to move the discharged bale from the location beneath the gate to a location rearward of the gate.
Figure 3:
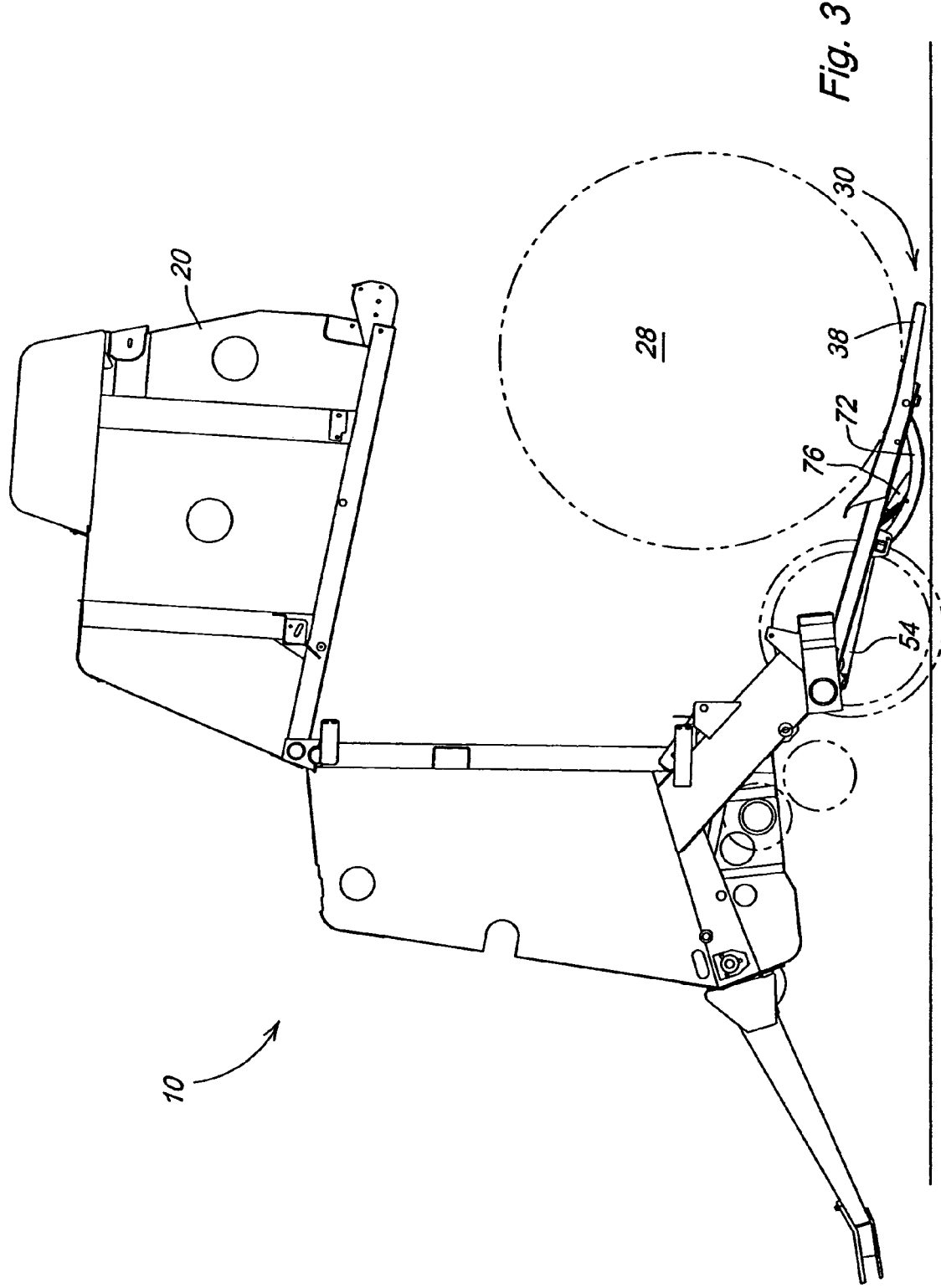
FIG. 3 is a view similar to that of FIGS. 1 and 2 showing the further progression of the bale discharge operation.
Figure 4:
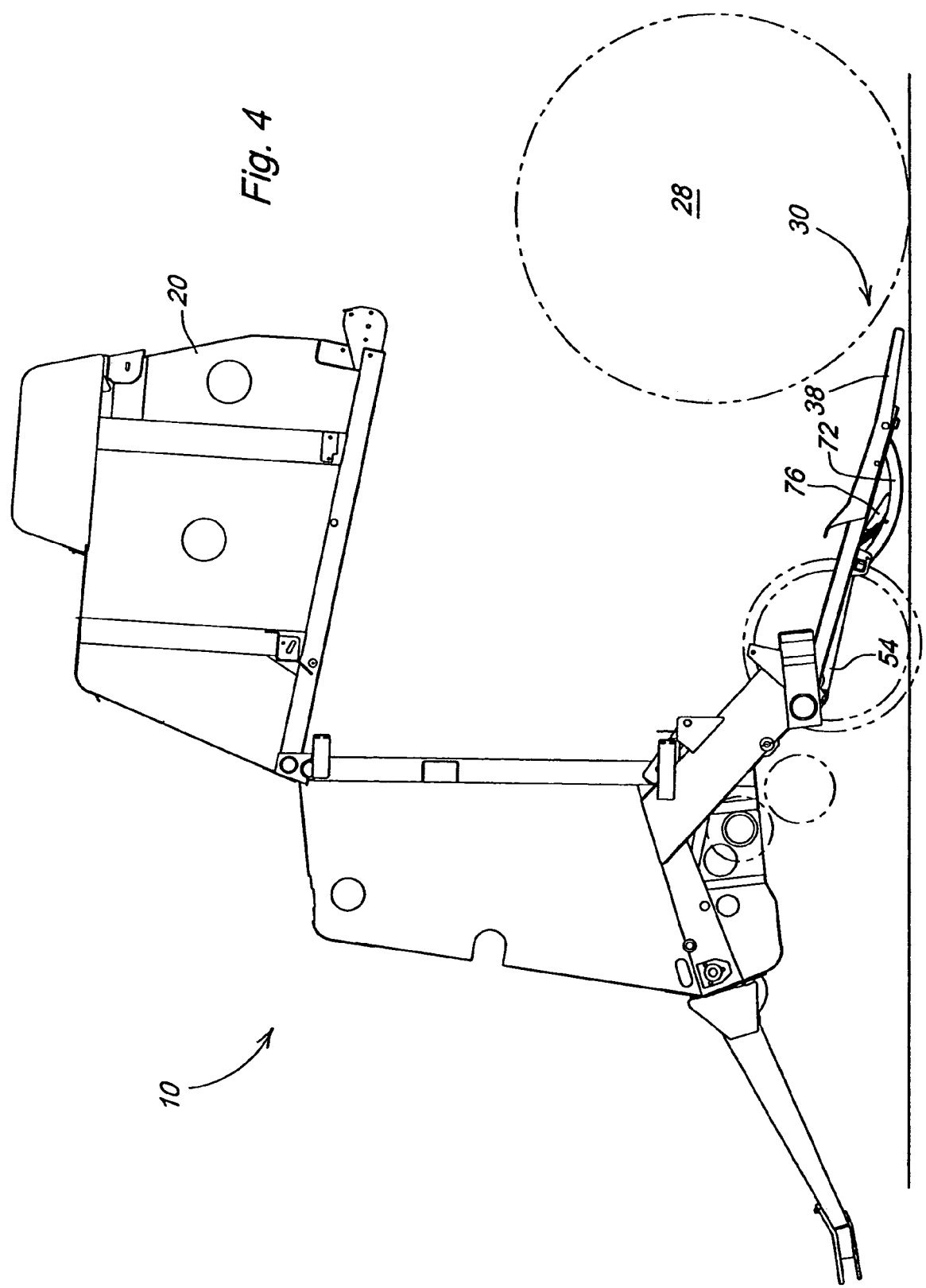
FIG. 4 is a view similar to that of FIGS. 1–3 showing still further progression of the bale discharge operation.

With reference again to FIG. 1 and also to FIGS. 2–4 the operation of the bale ejection mechanism 30 can be seen. More particularly, in FIG. 1 it can be seen that the bale forming process has been completed by the baler 10 and the discharge gate 20 has opened allowing the bale 28 to be deposited on the bale cradle 38. The angled shape of the bale cradle 38 serves to support the bale and prevent rolling of the bale. It will also be noted that the skid plate 72 has been extended by the hydraulic cylinder 76 so that the skid plate 72 is in contact with the ground and prevents the bale support and rail assemblies from pivoting downward. In FIG. 2 the length extensible actuator 54 of the rail assembly has been extended, thereby translating the bale support assembly and bale 28 rearward. In FIG. 3 the length extensible actuator 76 of the shoe assembly 36 has been retracted allowing the rail and bale support assemblies to pivot downward relative to the baler such that a rearward most portion of the bale cradle is nearly in contact with the ground. Thus there is little drop as the bale is discharged that would otherwise tend to cause rolling or damage to the bale. As the weight of the bale is thus shifted rearward the bale cradle is pivoted slightly relative to the rail assembly thereby creating a dumping action. With reference to FIG. 7 it can be seen that the slight pivoting of the cradle relative to the rail assembly is enabled due to the fact that the rollers 42A are of a smaller diameter than rollers 42B, thus as the center of gravity is shifted the bale support assembly pivots on the rollers 42B until the rollers 42A contact the upper flanges 60A of the rails 56. The dumping action is further facilitated as the bale support assembly 32 is translated far enough that the flanges 44 and wear plates 46 of the support members 40 disengage from the flanges 60 of the rails 56. This dumping action causes the bale to be deposited on the ground while imparting little rolling motion to the bale. In FIG. 4 it can be seen that the bale has been deposited on the ground and is free from the ejection mechanism. The ejection mechanism can now be reset. More particularly, as soon as the bale 28 is clear of the ejection mechanism the resilient members of the resilient support assembly tend to pivot the bale support and rail assemblies upward. The length extensible actuator 76 can now be actuated so as to again lift the bale support 32 and rail assemblies 34. When this happens the newly discharged bale is prevented from rolling forward toward the baler. Simultaneously, the length extensible actuator 54 is retracted so that the bale support assembly is translated back to the position of FIG. 1 so that the discharge gate can be closed and the baling process can continue.

In a preferred embodiment the the length extensible actuator 76 is a hydraulic cylinder that is controlled by a pressure compensating means such that variations in bale weight from one bale to another will not affect the descent rate of the ejection mechanism as it is pivoted downward relative to the baler. Such pressure compensating means could include a pressure compensating valve or an orifice in the actuator 76 itself. Because the pressure compensating means can be integrated into the actuator it has not been illustrated as a discrete element in the drawings.

It is contemplated that the ejection mechanism of the invention might further include an integrated means for weighing a bale just prior to discharge from the baler. The weighing means could comprise an electronic load cell or mechanical scale integrated on or between the bale support assembly and the rail assembly or between the rail assembly and the baler frame. Preferably, that bale weight is determined by measuring pressure differentials in the skid shoe actuator 76 and thus a discrete weighing device has not been separately illustrated.

It should be noted that if additional tilting for bale discharge is required due to geometry limitations, additional bale support tilt can be created by a weight shift of the bale support assembly, by changing the trajectory of the rail assembly and/or by changing the torque induced by the bale support cylinder. The hydraulics and timing of the system are integrated into the hydraulic baler functions (primarily the discharge gate) so that no additional action is required from the operator when ejecting the bale.

It should now be apparent that the bale ejection mechanism described above is operative to gently deposit a newly formed bale on the ground so that the discharge gate can be closed and without imparting any significant rolling motion to the bale. Thus the problems of twine or wrapping material unrolling as well as the need to back up the baler prior to bale discharge are avoided Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A bale ejection mechanism for an agricultural baler comprising:
   a bale receiver assembly mounted to a frame of the baler; and,
   a support mechanism for supporting the bale receiver assembly relative to a ground, the support mechanism having a rail frame and a around engaging support member, the ground engaging support member being secured to the rail frame by at least one resilient member and a length extensible actuator,
   wherein the bale receiver assembly comprises a bale support assembly slidably attached to the rail frame to move a newly formed bale rearwardly out of the baler and the support mechanism is operative to allow the bale receiver assembly to move downward in a controlled manner so that the bale is deposited on the ground such that a bale discharge gate of the baler can be closed without interference with the new bale.

2. A bale ejection mechanism as set forth in claim 1 wherein the support mechanism is operative to maintain a controlled rate of descent of the bale and receiver assembly.

3. A bale ejection mechanism as set forth in claim 1 wherein the ground engaging support member is movably mounted to the rail frame.

4. A bale ejection mechanism as set forth in claim 1 wherein the at least one resilient member tends to move the ground engaging member toward the rail frame.

5. A bale ejection mechanism as set forth in claim 1 wherein the bale receiver assembly comprises a rail assembly mounted to the baler and the bale support assembly movably supported by the rail assembly.

6. A bale ejection mechanism as set forth in claim 5 wherein the bale support assembly is comprised of a bale cradle mounted to at least one support member.

7. A bale ejection mechanism as set forth in claim 6 wherein the bale cradle is an angled plate member.

8. A bale ejection mechanism as set forth in claim 6 wherein at least one bearing element is journaled to the at least one support member.

9. A bale ejection mechanism as set forth in claim 7 wherein the support members include flange portions to which are affixed wear plates.

10. A bale ejection mechanism as set forth in claim 5 wherein the rail assembly is comprised of:
    the rail frame;
    a resilient support assembly; and,
    at least one length extensible actuator.

11. A bale ejection mechanism as set forth in claim 10 wherein the rail frame includes at least one rail.

12. A bale ejection mechanism as set forth in claim 11 wherein the at least one rail includes at least one bearing element.

13. A bale ejection mechanism as set forth in claim 10 wherein the resilient support assembly is attached to the baler frame.

14. A bale ejection mechanism as set forth in claim 12 wherein the at least one length extensible actuator is secured to a non-movable mounting point on or attached to the baler frame or the rail frame.

15. A bale ejection mechanism as set forth in claim 14 wherein the bale support assembly is movably mounted to the rail assembly such that at least one bearing element attached to the bale support assembly engages the at least one bearing elements of the at least one rail.

16. A bale ejection mechanism as set forth in claim 15 wherein as the length extensible actuator is extended and retracted the bale support assembly is movably translated back and forth relative to the rail assembly.

17. A bale ejection mechanism as set forth in claim 16 wherein the at least one bearing element of the bale support assembly comprises at least first and second bearing elements, the first bearing elements being of a smaller diameter than the second bearing elements so that as the center of gravity of the bale is shifted the bale support assembly pivots on the second bearing elements until the first bearing elements contact the bearing elements of the rails.

18. A bale ejection mechanism as set forth in claim 1 wherein the length extensible actuator that actuates the ground engaging member is controlled by pressure compensating means such that variations in bale weight from one bale to another will not affect a descent rate of the ejection mechanism as it is pivoted downward relative to the baler.

19. An improved agricultural baler for making cylindrical bales of crop material, the baler having a pair of opposed sidewalls, a bale forming chamber partially defined by the sidewalls wherein the crop material is rolled in spiral fashion into a cylindrical bale, and a bale discharge gate pivotally mounted to a front frame section, the bale discharge gate being moveable back and forth between a closed position for bale formation and an open position for bale discharge, wherein a completed bale is wrapped with twine or other appropriate wrapping material and is discharged by actuation of the discharge gate permitting the completed bale to be discharged from the baler, the improvement comprising:
  a bale receiver assembly mounted to a frame of the baler; and,
  a support mechanism for supporting the bale receiver assembly relative to a ground, the support mechanism having a rail frame and a ground engaging support member, the around engaging support member being secured to the rail frame by at least one resilient member and a length extensible actuator;
  wherein the bale receiver assembly comprises a bale support assembly slidably attached to the rail frame to move a newly formed bale rearwardly out of the baler and the support mechanism is operative to allow the bale receiver assembly to move downward in a controlled manner so that the bale is deposited on the ground such that the bale discharge gate of the baler can be closed without interference with the new bale.

20. An improved agricultural baler as set forth in claim 19 wherein the support mechanism is operative to maintain a controlled rate of descent of the bale and receiver assembly.

21. An improved agricultural baler as set forth in claim 19 wherein the ground engaging support member is movably mounted to the rail frame.

22. An improved agricultural baler as set forth in claim 19 wherein the at least one resilient member tends to move the ground engaging member toward the rail frame.

23. An improved agricultural baler as set forth in claim 19 wherein the bale receiver assembly comprises a rail assembly mounted to a frame of the baler and the bale support assembly movably supported by the rail assembly.

24. An improved agricultural baler as set forth in claim 23 wherein the bale support assembly is comprised of a bale cradle mounted to at least one support member.

25. An improved agricultural baler as set forth in claim 24 wherein the bale cradle is an angled plate member.

26. An improved agricultural baler as set forth in claim 24 wherein at least one bearing elements is journaled to the at least one support member.

27. An improved agricultural baler as set forth in claim 26 wherein the at least one support member includes a flange portion to which is affixed at least one wear plate.

28. An improved agricultural baler as set forth in claim 23 wherein the rail assembly is comprised of:
  the rail frame;
  a resilient support assembly; and,
  at least one length extensible actuator.

29. An improved agricultural baler as set forth in claim 28 wherein the rail frame includes at least one rail.

30. An improved agricultural baler as set forth in claim 29 wherein the at least one rail includes at least one bearing element.

31. An improved agricultural baler as set forth in claim 28 wherein the resilient support assembly is attached to the baler frame.

32. An improved agricultural baler as set forth in claim 30 wherein the at least one length extensible actuator is secured to a non-movable mounting point on or attached to the rail frame or baler frame.

33. An improved agricultural baler as set forth in claim 32 wherein the bale support assembly is movably mounted to the rail assembly such that at least one bearing elements attached to the bale support assembly engages the at least one bearing elements of the at least one rail.

34. An improved agricultural baler as set forth in claim 33 wherein as the length extensible actuator is extended and retracted the bale support assembly is movably translated back and forth relative to the rail assembly.

35. An improved agricultural baler as set forth in claim 34 wherein the at least one bearing element of the bale support comprises at least first and second bearing elements, the first bearing elements being of a smaller diameter than the second bearing elements so that as the center of gravity is shifted the bale support assembly pivots on the second bearing elements until the first bearing element contact the bearing elements of the rails.

36. An improved agricultural baler as set forth in claim 19 wherein the length extensible actuator that actuates the ground engaging member is controlled by a pressure compensation means such that variations in bale weight from one bale to another will not affect a descent rate of the bale receiver mechanism as it is pivoted downward relative to the baler.

* * * * *